Patented May 19, 1953

2,639,297

UNITED STATES PATENT OFFICE 2,639,297

PREPARATION OF 2-HYDROXY-1,6-HEXANEDIAL

Richard R. Whetstone and Seaver A. Ballard, Berkeley, Calif., assignors to Shell Development Company, San Francisco, Calif., a corporation of Delaware No Drawing. Application August 30, 1946, Serial No. 694,144

7 Claims. (Cl. 260—602)

1

This invention relates to aliphatic hydroxyaldehydes and to a method for their preparation from substituted dihydropyran compounds. The invention relates more particularly to aliphatic hydroxyaldehydes containing at least six carbon atoms and at least three functional groups, and to a method for their preparation from substituted dihydro-1,4-pyran compounds.

In accordance with the present invention, useful new aliphatic hydroxyaldehydes are produced by subjecting to the action of a hydrolytic medium a derivative of 2,3-dihydro-1,4-pyran having a formyl group at the 2 position of the dihydropyran ring. It unexpectedly has been discovered that under suitable conditions of reaction, advantageously high yields of hydroxyaldehydes containing three functional groups may be obtained, such yields approaching under appropriate conditions substantially quantitive conversions of the formyl-substituted dihydropyran compound to the hydroxyaldehyde. In accordance with the invention, there therefore is provided a process whereby the conversion of the formyl-substituted dihydropyran compounds to aliphatic hydroxyaldehydes may be effected, under suitable conditions, with a minimum of degredative or other possible side reactions, such conversion process being efficient and economical in operation and readily adaptable to practice on a scale commensurate with industrial requirements.

The hydroxyaldehydes produced by the method of the invention may be converted to new aliphatic hydroxy compounds, specifically trihydroxy compounds, that have been found to be of particular and improved utility as raw materials for the preparation of improved alkyd resins, surface coatings, and the like. Both the hydroxyaldehydes and the trihydroxy compounds of the present invention find wide utility for use as intermediates for the preparation of a wide variety of derived organic compounds.

In accordance with the present invention, there also is provided a process whereby the foregoing hydroxyaldehydes and trihydroxy compounds may be prepared with particular advantage and economy from alpha,beta-unsaturated aldehydes. Such a method of preparation, through the combination of steps employed, provides advantageously high yields of the desired compounds utilizing raw materials that are in many instances readily obtainable in industrial quantities, and hence offers particular advantages from the standpoint of large scale preparation of the compounds of the present invention.

2

The dihydropyran compounds which are employed in accordance with the present invention are those derivatives of 2,3-dihydro-1,4-pyran which have a formyl group directly attached to the carbon atom at the 2 position of the dihydropyran ring and which have a hydrogen atom attached to the carbon atom at the 6 position of the ring. The process of the invention is most effectively executed when applied to dihydropyran derivatives which have structures corresponding to the structural formula

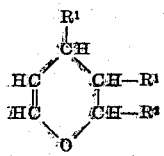

wherein each $R^1$ represents either hydrogen or an alkyl group containing not over six carbon atoms, and the $R^2$ represents a formyl group. Representative derivatives of dihydro-1,4-pyran which thus may be employed in accordance with the present invention include, for example, 2,3-dihydro-1,4-pyran-2-carboxaldehyde, 2,3 - dihydro-3,4 - dimethyl-1,4-pyran-2 - carboxaldehyde, 2,3 - dihydro-3,4-diethyl-1,4-pyran-2-carboxaldehyde, 2,3-dihydro-3-isopropyl-4-ethyl-1,4-pyran-2-carboxaldehyde, and homologous and analogous compounds. In a specific embodiment of the invention, there preferably is employed 2,3-dihydro-1,4-pyran-2-carboxaldehyde, thereby providing particular advantages in the matter of the products produced, the effectiveness with which the process may be executed, and in similar considerations.

In its broader aspects, the process of the present invention comprises subjecting to the action of a suitable hydrolytic medium a formyl-substituted dihydropyran of the hereindefined class under conditions which promote fission of the dihydropyran ring at the 6,1 position, with the addition of the elements of water. It has been found that by using suitable conditions, degredative or other possible side reactions can be minimized or substantially obviated, thereby providing desirably high yields of the products desired in accordance with the invention. As the hydrolytic medium there may be employed either pure water, water rendered mildly acidic by the addition of a suitable acidic material, or similar media. It has been found that the use of a substantially neutral hydrolytic medium, such as pure water or neutral, dilute salt solutions, provides desirable advantages in the present process.

Such substantially neutral hydrolytic media therefore generally are preferred. The presence of free alkali preferably is avoided. It has been found that alkaline media are less effective and in some cases may react upon the dihydropyran derivative with detriment. In the case of the formyl-substituted dihydropyrans that are substantially insoluble in or immiscible with water, a mutual homogenizing organic solvent such as a lower aliphatic alcohol, a ketone such as acetone, or similar organic solvents may be included, preferably in a minor amount, in the hydrolytic medium in order to promote mutual solubility of the reactants. Dispersing agents such as any of the dispersing agents suitable for promoting the formation of oil-in-water or water-in-oil emulsions also may be added to the hydrolytic medium, if desired, to favor intimate contact of the reactants. Generally speaking, however, highly effective results have been found to be obtainable without the necessity for addition of homogenizing or dispersing agents. The process therefore generally may be carried out satisfactorily in their absence.

When the process of the invention is effected by reaction with a mildly acidic hydrolytic medium, any suitably acidic material may be employed to impart the desired acidity, such as the strong mineral acids, hydrochloric acid, sulfuric acid, phosphoric acid, and the like, acid salts such as sodium acid sulfate, sodium dihydrogen phosphate, etc., or suitable organic acids such as acetic acid, chloroacetic acid, dichloroacetic acid, trichloroacetic acid, oxalic acid, tartaric acid, and other organic acids that have a sufficient solubility in water. The amount of acid material, if one is employed, desirably is sufficient to impart to the hydrolytic medium a pH not below about 1.0, a preferred range being an amount sufficient to impart to the hydrolytic medium a pH between about 1.0 and 2.5. Depending upon the other conditions employed, however, lesser amounts of acidic material may be used if desired. The amount of acidic material necessary in actual practice to impart the desired pH value to the reaction medium will, of course, depend upon the acid strength of the material, and the like, and can be determined readily by those skilled in the art. In the case of strongly acid materials such as the strong mineral acids, acid concentrations in the hydrolytic medium of from about 0.001 to about 0.05 equivalents per liter are effective. When employing media of higher pH values, weak acids or buffer salts may be used effectively, with the added advantage of providing desirable constancy to the pH of the reaction mixture.

When, as in the preferred practice of the invention, a substantially neutral hydrolytic medium is employed, there is used an aqueous medium that is devoid of any of the acidic agents referred to above, or of other acidic materials that would impart appreciable acidity to the medium. The minute traces of carbon dioxide that may be present from contact of the aqueous medium with the atmosphere are without noticeable effect upon the outcome of the process. The pH value of the substantially neutral medium thus generally is found to lie between about 6.0 and 7.0. The substantially neutral aqueous medium may comprise distilled water, or ordinary tap water that is free of excessively acidic dissolved materials. It may contain, if desired, organic solvents or dispersing agents such as those referred to hereinbefore. Buffer salts may be added in suitable kind and amount and as readily may be determined by those skilled in the art, to maintain the aqueous medium under conditions of substantial neutrality.

In accordance with the process of the invention, relatively mild conditions of reaction between the formyl-substituted dihydropyran and the hydrolytic medium are employed. Insufficiently rigorous conditions of reaction tend to lead to excessively low yields of the desired products of reaction, apparently due to the factor that fission of the dihydropyran ring is not brought about even though addition of the elements of water may occur. Excessively drastic conditions of hydrolytic reaction tend to promote, on the other hand, side reactions of undetermined nature which result in the formation of undesired by-products and therefore also result in reduction in yield. The use of substantially neutral hydroyltic media is particularly efficacious in serving to avoid such possible side reactions. In any given case, the conditions of temperature, time, etc., most suitably adapted to effect the desired hydrolytic reaction can be determined on the basis of the increase in the carbonyl content of the reaction mixture during reaction, the optimum conditions of reaction leading to maximum increase in the carbonyl content. Under optimum conditions, yields of the desired hydroxyaldehydes in excess of 85 per cent, based on the amount of formyl-substituted dihydropyran employed, are readily obtainable.

The hydrolysis of the formyl-substituted dihydropyran is effected in accordance with the invention under conditions of time and temperature that may be correlated with the acidity of the hydrolytic medium. Excessively low temperatures under any given conditions tend to be ineffective in promoting the desired hydrolytic reaction, whereas excessively high temperatures may promote undesired side reactions, etc. In general, the degree of temperature suited to provide optimum results is proportional to the pH value of the reaction mixture, higher pH values of the reaction mixture indicating the use of higher temperatures of reaction, and lower pH values rendering suitable the use of lower reaction temperatures. At any given pH, however, a considerable latitude in the temperature is possible. In relatively acidic reaction mixtures, i. e., at pH values of from about 1.0 to about 2.5, temperatures of from 10° C. to about 40° C., preferably about 20° C. to about 30° C., have been employed with particular effectiveness, although higher temperatures are permissible. Under substantially neutral conditions of reaction, higher temperatures are preferable, from about 50° C. to about 100° C. providing optimum results at pH values between about 6.0 and about 7.0. Where the formyl-substituted dihydropyran is hydrolyzed by treatment with pure water as the hydrolytic medium, temperatures of about 80° C. to about 100° C. are most effective.

The time of reaction that is employed in the process of the invention depends in any given instance upon the acidity of the reaction mixture, the temperature employed, the particular dihydropyran compound being subjected to hydrolytic treatment, and upon the other possible conditions of reaction. The time of reaction may be varied widely, from about 0.5 hour upwards. For example, at a pH between about 6.0 and 7.0 and with a reaction temperature of from about 80° C. to about 100° C., effective yields of hydroxyaldehydes have been obtained in from about 0.5 to about 2.0 hours. Longer reaction times may be employed if desirable.

The reaction between the formyl-substituted dihydropyran of the hereindefined class and the hydrolytic medium may be effected in any suitable manner, either batchwise, intermittently, or continuously. In the case of batchwise operations, the formyl-substituted dihydropyran and the hydrolytic medium may be mixed together, preferably with agitation, and kept in intimate contact under agitation for the requisite period of time. The process also may be effected continuously, as by counter-current or concurrent mixing of two streams of the reactants under suitable conditions of time, temperature, etc. Preferably there is employed at least one part by weight of hydrolytic medium per part of the formyl-substituted dihydropyran, amounts of hydrolytic medium corresponding to from about 1.5 to about 25 parts, preferably from about 1.5 parts to about 3.5 parts, per part of the formyl-substituted dihydropyran being particularly effective.

After completion of the reaction, the hydroxyaldehydes formed by the process may be recovered, if desired, from the hydrolytic medium in any suitable manner. Acid material, if present, thus may be neutralized, preferably by the addition of a suitable salt comprising an anion of a volatile acid and a cation which will form an insoluble salt by reaction with the acid material. Acid material, if present, also may be removed by treatment of the mixture with a suitable ion-exchange resin capable of removing acid, by addition of alkalies, or otherwise. After removal of any solids that thus may be present, the water may be removed as by fractional distillation under reduced pressure or by other suitable means and the hydroxyaldehyde further purified by fractional distillation, by treatment with selective solvents, or by any other effective method.

The hydroxyaldehydes provided by the present invention are most favorably exemplified by the specific compound 2-hydroxy-1,6-hexanedial which may be prepared advantageously from 2,3-dihydro-1,4-pyran-2-carboxaldehyde by the foregoing method. Other hydroxyaldehydes which may be prepared from dihydropyran-2-carboxaldehydes of the present class include, for example, 2-hydroxy-3,4-dimethyl-1,6-hexanedial, 2-hydroxy-3,4-diethyl-1,6-hexanedial, 2-hydroxy-3-isopropyl-4-ethyl-1,6-hexanedial, 2-hydroxy-3,4-diisopropyl-1,6-hexanedial, and homologous and analogous 2-hydroxy-1,6-hexanedials.

In accordance with the present invention, the hydrolytic fission of the formyl-substituted dihydropyran compounds of the herein defined class may be combined effectively with suitable hydrogenation treatment to provide useful new aliphatic triols having hydroxyl groups in the 1, 2 and 6 positions of the carbon chain, represented specifically by the preferred compound 1,2,6-hexanetriol. The hydrogenation may be effected either subsequent to the hydrolytic treatment or concurrently therewith. It may be effected either electrolytically, chemically, or catalytically in the presence of hydrogen gas. Catalytic hydrogenation in the presence of hydrogen gas is preferred because of its greater effectiveness, the more favorable yields of triol obtained, and similar considerations.

The hydroxyaldehydes may be catalytically hydrogenated in accordance with the invention by treatment with hydrogen gas under effective conditions of hydrogenation and in the presence of catalytic amounts of a suitably active hydrogenation catalyst. The hydrogenation catalysts which may be employed are any members or combination of members of the group of materials referred to and known as "hydrogenation catalysts" and which have the requisite activity under the conditions employed for effecting hydrogenation. Catalytically active metals, or compounds of metals, may be employed effectively, among the suitable materials being, for example, oxides or sulfides of metals, such as of nickel, molybdenum, tungsten, cerium, chromium, thorium, etc. or mixtures of two or more of the same. Metal catalysts which may be applied effectively in accordance with the process of the present invention include nickel, iron, copper, cobalt, chromium, thallium, etc., as well as a preferred class of hydrogenation catalysts composed of noble metals such as gold, platinum, palladium, etc. Particularly favorable results have been obtained with the active nickel catalyst known generally to the art as Raney nickel catalyst and prepared by digesting a nickel-aluminum alloy in a concentrated solution of caustic alkali so as to dissolve the aluminum therefrom and leave a residue of finely-divided, highly active metallic nickel. The amount of catalyst that is used preferably is between about 5% and about 20% by weight of the hydroxyaldehyde, although it is subject to variation in either direction depending upon the conditions of hydrogenation, the activity of the specific catalyst, and the like.

The hydroxyaldehydes may be dispersed or dissolved in any suitable inert liquid medium such as water, or organic solvents such as lower aliphatic alcohols, ketones, the glycols, and the like, and treated with gaseous hydrogen in the presence of the aforesaid hydrogenation catalyst. The solvent or dispersing medium preferably is one in which the hydroxyaldehyde is relatively soluble and is selected accordingly. Water generally is highly satisfactory as the solvent medium. An amount sufficient to render the hydrogenation mixture readily mobile desirably is employed, from about 1 to about 20 parts, preferably from about 2 to about 10 parts, of solvent medium per part of hydroxyaldehyde being employed.

The hydrogenation most conveniently may be carried out in the same solvent that was used in the hydrolysis step of the process, namely, water, or a mixture of water with an organic homogenizing solvent. The hydroxyaldehydes provided by the hydrolysis step of the process usually are reactive compounds, and it is possible, in this manner, to avoid the necessity for their isolation prior to hydrogenation.

Any suitable reaction vessel may be employed for the hydrogenation treatment. The hydrogenation may be carried out either intermittently, batchwise, or continuously.

Mild conditions of hydrogenation are most effective for accomplishing the hydrogenation of the present hydroxyaldehydes. Temperatures of from about 50° C. to about 150° C. thus have been found to be particularly effective, although somewhat higher temperatures may be employed if desired. Relatively mild conditions of hydrogen pressures are effective in most cases and have the advantage of removing the necessity for excessively cumbersome or expensive equipment necessary for operations under extremely high pressures. Hydrogen pressures of from about 100 to about 500 pounds per square inch thus have been employed with desirable effectiveness, although the use of higher hydrogen pressures up to, say, 5000 pounds per square inch, is not precluded.

The process of the present invention may be executed conveniently by subjecting the formyl-substituted dihydropyran compound to simultaneous conditions of hydrolysis and of hydrogenation. Thus, the hydrogenation catalyst may be added directly to the hydrolytic medium, preferably under non-acidic conditions, and the whole subjected to the action of hydrogen gas under superatmospheric pressure and while maintained at an elevated temperature sufficient to promote hydrolytic reaction under the conditions employed. Temperatures of from about 50° C. to about 100° C. may be employed with highly satisfactory results, the simultaneous hydrogenation and hydrolytic treatments preferably being effected in a substantially neutral aqueous reaction medium. Thus, the formyl-substituted dihydropyran may be mixed with water in the previously indicated proportions and an effective amount of hydrogenation catalyst added thereto. The mixture then may be subjected to the action of hydrogen at superatmospheric pressure and at an elevated temperature for a period of time sufficient to effect the simultaneous hydrolysis and hydrogenation reactions. After removal of the catalyst from the mixture, 1,2,6-hexanetriol may be recovered from the mixture in highly satisfactory yields.

In accordance with the invention, the hydrogenation treatment preferably is continued until hydrogenation is complete, i. e., until no more hydrogen is absorbed. Hydrogen uptakes corresponding to 2 moles of hydrogen per mole of the 2-hydroxy-1,6-hexanedials or dihydropyran-2-carboxaldehydes thus may be obtained.

After completion of the hydrogenation treatment, the 1,2,6-hexanetriols may be recovered from the reaction mixture in any suitable manner. The catalyst may be removed by filtration, by sedimentation, by centrifugation, or otherwise, and the liquid mixture then subjected to any suitable purification treatment, fractional distillation generally being preferable. The 1,2,6-hexanetriols are generally liquid products and after recovery may be stored over prolonged periods of time without deterioration or decomposition.

An advantageous feature of the present invention comprises the preparation of the present compounds in a highly effective manner from alpha,beta-olefinically unsaturated aldehydes such as acrolein, crotonaldehyde, beta-ethylacrolein, beta-isopropylacrolein and other homologs of acrolein having an olefinic bond in the alpha,beta position relative to the carbonyl group. The process is particularly effective in the preparation of 2-hydroxy-1,6-hexanedial and 1,2,6-hexanetriol from acrolein because of the high yields that are obtained. The alpha,beta-unsaturated aldehyde thus may be condensed, or reacted, at an elevated temperature and in the presence of an antioxidant compound such as a phenolic antioxidant compound to provide effective yields of dihydropyran-2-carboxaldehyde, and the product thus obtained converted to the hereindescribed compounds as described. In effecting the condensation, the unsaturated aldehyde may be heated alone or in the presence of a suitable organic solvent such as benzene, toluene, xylene, and the like, under superatmospheric pressure and to a temperature of about 160° C. to 250° C. and in the presence of from about 0.5 to about 5 per cent of an antioxidant compound such as hydroquinone for a period of time sufficient to effect the desired formation of dihydropyran-2-carboxaldehyde, and the product thus obtained recovered and employed in the process of the present invention. In its broader aspects, the present invention is not limited as to the method of preparation of the formyl-substituted dihydropyran compound that is utilized. However, it has been found that the combination of steps involved in the preparation of compounds of the present class from acrolein as the ultimate raw material offers substantial and unexpected advantages in respect to overall yield, ease of operation, economy, and the like, and therefore constitutes a preferred embodiment of the invention.

The compounds provided by the present invention are useful as intermediates for the preparation of a wide variety of chemical compounds, their value in this respect residing in part upon the character of the functional groups and in part upon their positions in the molecule. The hydroxyaldehydes may be converted by suitable reactions, to esters, to carboxylic acids of mixed function such as hydroxy acids and hydroxyaldehyde acids, to nitrogenous derivatives such as amines, amides, and the like, and to similar derivatives obtained by reaction at one or more of the functional groups of the molecule. The combination and the configuration of the functional groups in the case of the present hydroxydials, renders these compounds of particular value as raw materials in the preparation of resins such as urea-aldehyde resins formed by reaction with both an aldehyde and a hydroxyl compound. The triols of the present invention are of particular merit as improved humectants, plasticizers and the like. The triols, particularly 1,2,6-hexanetriol, have been found to have unexpected advantages as ingredients useful in the preparation of improved alkyd resins as by reaction with one or more polycarboxylic acids, in the presence of modifying monocarboxylic acids on other materials if desired. The substituted 1,2,6-hexanetriols also are useful as intermediates in organic syntheses, their value residing in part upon their containing the combination, in an aliphatic molecule of at least six carbon atoms, of two hydroxyl groups attached to primary aliphatic carbon atoms, and one hydroxyl group attached to a secondary aliphatic carbon atom, with resultant desirable advantages in the properties of the molecule as a whole.

The following examples will illustrate certain specific embodiments of the present invention. It will be appreciated, of course, that the examples are presented for the purpose of illustration, and not with the intent to limit unnecessarily the invention as it is defined in the appended claims:

EXAMPLE I

*Hydrolysis of 2,3-dihydro-1,4-pyran-2-carboxaldehyde in water*

One hundred parts of 2,3-dihydro-1,4-pyran-2-carboxaldehyde were mixed with 400 parts of water at 90° C. The mixture was maintained with agitation at this temperature for two hours. Samples of the reaction mixture were withdrawn at intervals. The carbonyl content of each sample was determined by adding the sample to a measured excess of hydroxylamine hydrochloride and titrating the mixture with standardized aqueous sodium hydroxide solution. The following results were obtained, the per cent hydrolysis being calculated from the measured increase in carbonyl content of the reaction mixture.

| Reaction Time (minutes) | Hydrolysis (percent) |
|---|---|
| 0 | 0 |
| 17 | 37 |
| 40 | 71 |
| 62 | 80 |

After 90 minutes reaction time the water was removed from the reaction mixture by distillation under reduced pressure, whereby 2-hydroxy-1,6-hexanedial was recovered in a yield of approximately 90 per cent based on the amount of 2,3-dihydro-1,4-pyran-2-carboxaldehyde employed. 2-hydroxy-1,6-hexanedial may be referred to by the synonymous chemical name alpha-hydroxyadipaldehyde. 2,3-dihydro-1,4-pyran-2-carboxaldehyde may be referred to by the synonymous chemical name 3,4-dihydro-1,2-pyran-2-carboxaldehyde.

EXAMPLE II

*Hydrolysis of 2,3-dihydro-1,4-pyran-2-carboxaldehyde in water and subsequent hydrogenation*

A mixture of 504 parts of 2,3-dihydro-1,4-pyran-2-carboxaldehyde and 1008 parts of water was heated at 85° C. for 2.5 hours; after 1.5 hours heating the hydrolysis was 93 per cent complete. Twenty parts of Raney nickel catalyst were suspended in the resulting solution, and the mixture was subjected to the action of hydrogen gas at a pressure of about 175 pounds per square inch and a temperature of about 75° C. for 24 hours. After removal of the catalyst, the mixture was distilled. 1,2,6-hexanetriol was recovered in 80% yield, based on the total amount of organic material recovered, at a distillation temperature of 160–170° C. under a pressure of 2 to 3 millimeters of mercury.

EXAMPLE III

*Hydrolysis of 2,3-dihydro-1,4-pyran-2-carboxaldehyde in dilute sulfuric acid solution*

Example I was repeated employing 0.0228 N sulfuric acid solution instead of the pure water and at a reaction temperature of 20–30° C. The following results were obtained.

| Reaction Time (minutes) | Hydrolysis (percent) |
|---|---|
| 0 | 0 |
| 13 | 70 |
| 77 | 90 |
| 105 | 90 |

A further sample of the solution was withdrawn. A semi-carbazone of the 2-hydroxy-1,6-hexanedial, prepared therefrom, melted after two recrystallizations from 80% ethanol, at 191.2–192.8° C.

Upon neutralization of the sulfuric acid by addition of calcium carbonate, and removal of the precipitated calcium sulfate and the water, 2-hydroxy-1,6-hexanedial was recovered from the reaction mixture in a yield of about 90 per cent. The dialdehyde was a viscous liquid which overnight under vacuum was transformed to a clear, colorless, sticky solid. The solid product when heated under vacuum was reconverted to the viscous liquid distilling at 78–82° C. under a pressure of 1.5 millimeters mercury and which had a refractive index ($n$ 20/D) of 1.4766.

EXAMPLE IV

*Hydrolysis of 2,3-dihydro-1,4-pyran-2-carboxaldehyde with dilute acetic acid solution*

Example III was repeated employing 0.02 N aqueous acetic acid in lieu of the sulfuric acid solution. The following results were obtained:

| Reaction Time (minutes) | Hydrolysis (percent) |
|---|---|
| 0 | 0 |
| 13 | 5 |
| 70 | 6 |
| 169 | 11 |
| 1,370 | 45 |

The rate of hydrolysis could have been increased to a rate approximating that observed in Examples I, II, and III by increasing the temperature to a higher value.

EXAMPLE V

*Preparation of 1,2,6-hexanetriol from 2,3-dihydro-1,4-pyran-2-carboxaldehyde*

One hundred parts of 2,3-dihydro-1,4-pyran-2-carboxaldehyde were dissolved in 399 parts of 0.228 N sulfuric acid solution. After one hour at 29° C. to 30° C., one part of solid calcium carbonate was added to the reaction mixture, and the mixture was filtered. Five parts of Raney nickel catalyst were added to the resulting solution and the mixture was subjected at 75° C. to the action of hydrogen gas under a pressure of 150 pounds per square inch (gauge) for 25 hours. The catalyst then was removed by filtration and the filtrate was distilled. There were recovered 74 parts of 1,2,6-hexanetriol distilling at 155° C. to 159° C. under a pressure of 1.5 millimeters mercury and having the following properties.

| | |
|---|---|
| Refractive index ($n$ 20/D) | 1.58 |
| Density ($d$ 20/4) | 1.03 |
| Acetyl value____equivalents per 100 grams__ | 2.20 |
| Carbonyl value _____do____ | 0.001 |

EXAMPLE VI

*Preparation of 1,2,6-hexanetriol from acrolein*

Acrolein containing 1 per cent of hydroquinone was dissolved in an equal weight of benzene and heated in a glass lined reaction vessel under autogenous pressure at 170° C. for 2½ hours. The resultant mixture was fractionally distilled with separation of 2,3-dihydro-1,4-pyran-2-carboxaldehyde in 57 per cent conversion and 94 per cent yield. Four hundred fifty parts of this latter product was hydrolyzed by treatment with 1795 parts of 0.0152 N sulfuric acid solution for one hour at room temperature. The acid was neutralized with calcium carbonate, the mixture filtered, and the filtrate heated to 50° C. Raney nickel catalyst was added in an amount corresponding to 5 per cent of the 2,3-dihydro-1,4-pyran-2-carboxaldehyde and the mixture was hydrogenated at a minimum temperature of 150° by treatment with hydrogen gas at a maximum pressure of 150 pounds per square inch. After removal of the catalyst, distillation of the resultant product led to the separation, in addition to water, low boiling material and bottoms, of a fraction of 418 parts of 1,2,6-hexanetriol distilling at 170° C. to 171° C. under 2 millimeters mercury pressure and having a refractive index (n 20/D) of 1.477.

We claim as our invention:

1. 2-hydroxy-1,6-hexanedial.
2. A process of preparing 2-hydroxy-1,6-hexanedial which consists in reacting 2,3-dihydro-1,4-pyran-2-carboxaldehyde with water under neutral to acidic conditions of reaction.
3. A process of preparing 2-hydroxy-1,6-hexanedial which comprises reacting 2,3-dihydro-1,4-pyran-2-carboxaldehyde with an aqueous hydrolytic medium to promote fission of the dihydropyran ring in the 6,1 position with addition of the elements of water.
4. A process which consists in mixing a 2,3-dihydro-1,4-pyran-2-carboxaldehyde with water and reacting said 2,3-dihydro-1,4-pyran-2-carboxaldehyde in admixture with the water to produce a 2-hydroxy-1,6-hexanedial.
5. A process which comprises mixing 2,3-dihydro-1,4-pyran-2-carboxaldehyde with water and reacting the 2,3-dihydro-1,4-pyran-2-carboxaldehyde with the water at a pH represented by a pH value below about pH 7 at a temperature of from about 10° C. to about 100° C. to produce 2-hydroxy-1,6-hexanedial.
6. A process which comprises heating with agitation 2,3-dihydro-1,4-pyran-2-carboxaldehyde in admixture with water at a pH value between about 1.0 and about 2.5 at a temperature of from about 10° C. to about 40° C. and distilling water from the resulting solution to leave a concentrated aqueous solution of 2-hydroxy-1,6-hexanedial.
7. A process which comprises mixing a 2,3-dihydro-1,4-pyran-2-carboxaldehyde with water and heating the mixture with agitation at a temperature of from about 10° C. to about 100° C.

RICHARD R. WHETSTONE.
SEAVER A. BALLARD.

References Cited in the file of this patent

UNITED STATES PATENTS

| Number | Name | Date |
|---|---|---|
| 2,097,493 | Leuck | Nov. 2, 1937 |

FOREIGN PATENTS

| Number | Country | Date |
|---|---|---|
| 913,934 | France | June 11, 1946 |

OTHER REFERENCES

Adler, Chem. Abstr., vol. 35, col. 6955–56 (1941).

Beilstein, vol. 1, pg. 893, 1944 ed.; vol. 1, pp. 848–53, 1918 ed.

Ser. No. 367,265, Wolff (A. P. C.), published Apr. 20, 1943.

Paul, Bull. Soc. Chim., 5 Ser. Tome 1 pt., 2 pgs. 971–80.

Zartman et al., Jour. Am. Chem. Soc., vol. 55, pp. 4559–63 (1933).

Wilson, Jour. Chem. Soc. (London), pp. 48–52 (1945).

Paul, Bull. Soc. Chim. de France, vol. 8, pp. 369–75 (1941).